(12) United States Patent
Linnig et al.

(10) Patent No.: US 9,359,998 B2
(45) Date of Patent: Jun. 7, 2016

(54) LIQUID TREATMENT APPARATUS

(75) Inventors: Jan Linnig, Augustenborg (DK); Michael Laursen, Soenderborg (DK)

(73) Assignee: Danfoss A/S, Nordborg (DK)

( * ) Notice: Subject to any disclaimer, the term of this patent is extended or adjusted under 35 U.S.C. 154(b) by 869 days.

(21) Appl. No.: 12/278,018

(22) PCT Filed: Feb. 8, 2007

(86) PCT No.: PCT/DK2007/000065
§ 371 (c)(1), (2), (4) Date: Dec. 3, 2008

(87) PCT Pub. No.: WO2007/090406
PCT Pub. Date: Aug. 16, 2007

(65) Prior Publication Data
US 2009/0289008 A1    Nov. 26, 2009

(30) Foreign Application Priority Data

Feb. 10, 2006   (DK) .................................. 2006 00193

(51) Int. Cl.
| | |
|---|---|
| *B01D 61/12* | (2006.01) |
| *B01D 61/06* | (2006.01) |
| *F04B 17/00* | (2006.01) |
| *B01D 61/02* | (2006.01) |
| *C02F 1/44* | (2006.01) |
| *F04B 1/12* | (2006.01) |
| *F04B 17/03* | (2006.01) |

(Continued)

(52) U.S. Cl.
CPC .............. *F04B 17/00* (2013.01); *B01D 61/025* (2013.01); *B01D 61/06* (2013.01); *B01D 61/12* (2013.01); *C02F 1/441* (2013.01); *F04B 1/128* (2013.01); *F04B 17/03* (2013.01); *F04F 13/00* (2013.01); *B01D 2313/243* (2013.01); *B01D 2317/04* (2013.01); *C02F 2103/08* (2013.01)

(58) Field of Classification Search
None
See application file for complete search history.

(56) References Cited

U.S. PATENT DOCUMENTS

| | | | |
|---|---|---|---|
| 4,772,385 A | | 9/1988 | Yamada et al. |
| 5,482,441 A | * | 1/1996 | Permar .................. 417/216 |
| 5,588,347 A | | 12/1996 | Jepsen |

(Continued)

FOREIGN PATENT DOCUMENTS

| | | |
|---|---|---|
| AU | 2007214125 B2 | 8/2007 |
| DE | 2533151 A1 | 2/1976 |

(Continued)

OTHER PUBLICATIONS

International Search Report for PCT/DK2007/000065 dated May 4, 2007.

*Primary Examiner* — Krishnan S Menon
(74) *Attorney, Agent, or Firm* — McCormick, Paulding & Huber LLP

(57) ABSTRACT

The invention provides a liquid treatment apparatus such as a reverse osmosis apparatus wherein a portion of an inlet liquid permeates through a filter or a membrane e.g. to provide freshwater from saltwater. The apparatus comprises a pump which provides the necessary pressure of the liquid to drive the permeation process, and a recovery unit which transfers pressure of a residue quid to the inlet liquid. The pump and the recovery unit are driven at synchronous and variable speed to control the output and thereby e.g. to adjust for fouling of the filter or membrane. The invention further provides methods of controlling the synchronous speed, e.g. based on a pressure or based on the consumption of the produced liquid.

8 Claims, 3 Drawing Sheets

(51) Int. Cl.
*F04F 13/00* (2009.01)
*C02F 103/08* (2006.01)

(56) References Cited

U.S. PATENT DOCUMENTS

| | | |
|---|---|---|
| 7,297,268 B2 | 11/2007 | Herrington et al. |
| 2004/0178145 A1 | 9/2004 | Herrington et al. |
| 2006/0065597 A1* | 3/2006 | Kunczynski ............. 210/637 |

FOREIGN PATENT DOCUMENTS

| | | |
|---|---|---|
| EP | 0190741 A1 | 8/1986 |
| EP | 0774073 B1 | 5/1997 |
| EP | 1256371 A | 11/2002 |
| FR | 2281782 A1 | 3/1976 |
| WO | 2004065308 A | 8/2004 |
| WO | 2007090406 A1 | 8/2007 |

* cited by examiner

LIQUID TREATMENT APPARATUS

CROSS REFERENCE TO RELATED APPLICATIONS

This application is entitled to the benefit of and incorporates by reference essential subject matter disclosed in International Patent Application No. PCT/DK2007/000065 filed on Feb. 8, 2007 and Danish Patent Application No. PA 2006 00193 filed Feb. 10, 2006.

TECHNICAL FIELD

The present invention relates to a liquid treatment apparatus comprising:
- a separation structure comprising a membrane, an inlet for receiving an inlet liquid, a first outlet for delivering a first liquid which has not passed through the membrane, and a second outlet for delivering a second liquid which has passed through the membrane,
- a displacement pump adapted to supply an amount of inlet liquid to the separation structure proportional to the rotation of a pump element, and
- a pressure recovery unit adapted to drain an amount of first liquid from the separation structure proportional to the rotation of a recovery element.

BACKGROUND OF THE INVENTION

Devices in which a liquid substance passes through a membrane are commonly used for separating substances of a liquid composition. In connection with water treatment, such devices are used for desalination purposes by separation of dissolved salts from water, and for water purification in general e.g. by separation of contaminants such as bacteria and virus from water. Similar devices are used for removing liquid from fruit juice to provide a concentrate thereof and in general for removing substances from a liquid or for concentrating substances in a liquid.

In general, the separation structure receives a liquid composition comprising various substances, in the following referred to as inlet liquid, and delivers two different liquids each having different contents of one of more substances. Certainly, both of these two different liquids may be valuable. Often, however, one of the two liquids is a desired liquid, and the other one is to be disposed of. To distinguish the two liquids, the following description will be based on the term "the first liquid" for the liquid which has not passed through the membrane, and "the second liquid" for the liquid which has passed through the membrane.

In general, it is desired that as much liquid as possible permeates through the membrane. This may be achieved by increasing the pressure difference across the membrane, i.e. by increasing the pressure of the inlet liquid to a point which is close to a maximum limit prescribed for the membrane. In a desalination plant working in accordance with the principles of reverse osmosis, the inlet water (saltwater) is typically pressurised to approximately 60-70 bar depending upon the salt concentration. At this pressure, the saltwater enters a separation structure with a reverse osmosis membrane which is permeable to pure water. Since the utilization rate is typically 25-35%, 65-75% of the saltwater is rejected from the system as a residual product of the process (the first fluid). This rejected water has a higher salt concentration than the received saltwater and will in the following be referred to as brine. During returning of the brine, it undergoes a pressure drop of 60-70 bar and the energy thereby released corresponds to 65-75 percent of the energy which has been consumed by the pump which initially raised the pressure of the saltwater. In order to recover the energy which is released during the returning of the seawater, a pressure recovery unit is often inserted after the separation structure.

A reverse osmosis system is shown e.g. in U.S. Pat. No. 5,482,441.

The pressure recovery unit not only recovers the pressure and thus saves energy; it also provides a sufficient back pressure in the outlet of the first fluid.

A general problem with the existing devices is that fouling in the membrane increases the resistance against permeation of the liquid through the membrane. As a consequence, a fixed pressure of the inlet liquid provides a ratio between the first liquid and the second liquid which changes over time. This characteristic of the known devices is undesired. Firstly, the loading and thus the wear of the often very expensive membrane increases over time, and secondly, a specific consumption of the first and/or second liquid requires over-dimensioning of the device when the membrane is new.

BRIEF DESCRIPTION OF THE INVENTION

It is an object of the present invention to enable a more constant capacity of a liquid treatment apparatus and to enable a reduced wear on the membrane. Accordingly, the invention, in a first aspect, provides an apparatus of the kind mentioned in the introduction wherein the drive structure is adapted to provide a variable and synchronous speed of the pump element and the recovery element.

The inlet fluid must necessarily leave the separation structure either in the form of the first fluid or in the form of the second fluid. Since the supplied amount of inlet liquid is proportional to the rotation of the pump element and the drained amount of first liquid is proportional to the rotation of the recovery element, the amount of liquid which permeates through the membrane, i.e. the second liquid, is determined by the difference between the two amounts. Since the speed of the pump element and the recovery element is variable and synchronous, the invention facilitates an easy way of varying the total flow of liquid through the separation structure without having to consider adjustments of the back pressure, or the invention may be utilised to provide a fixed flow of liquid through the separation structure even though the membrane fouls over time.

The separation structure may e.g. be a filtration structure or a reverse osmosis structure of the known kind, i.e. comprising an inlet and an outlet on one side of a membrane and an outlet on an opposite side of the membrane. Depending on the membrane, the separation could provide pure water from saltwater or from contaminated water, or the separation could provide a concentrated product from a less concentrated primary produce, e.g. concentrated juice from less concentrated juice.

The displacement pump may provide an essentially fixed geometric displacement relative to the rotation of the pump element. Such characteristics are known from vane pumps, axial piston pumps, gerotor pumps, radial piston pumps and others. In contrast to centrifugal pumps in which the ratio between the rotation and the amount of displaced liquid depends entirely on the backpressure, wing pumps and axial piston pumps provide essentially the same amount for a given RPM taking only the efficiency into consideration. The efficiency is defined as an amount of the liquid which passes through the pressure recovery unit or the displacement pump from an inlet to an outlet relative to a backflow of liquid in the opposite direction. Based on the efficiency of the pump, the amount of pumped liquid relative to the rotation to a certain degree depends on the backpressure.

The pressure recovery unit could be of a similar structure as the displacement pump. In one embodiment at least one, and preferably both the pump and the recovery unit are axial piston units, e.g. of the kind disclosed in EP 0 774 073. The displacement pump and the pressure recovery unit could also be combined into one unit.

The drive structure could be a regular electrically or hydraulically driven motor provided with control means for adjusting the rotational speed, e.g. a frequency converter for changing the rotational speed of an AC motor. Alternatively, the motor could be a Frequency controlled motor (FCM). The motor could be connected to one shaft which drives both the pump element and the recovery element. In another embodiment, two separate motors drive the pump element and the recovery element individually. In this embodiment, the synchronisation between rotations of the two elements could be established by a controller which controls the speed of the two motors. In another embodiment, the pump and recovery unit could be integrated into one single unit which is driven by one single motor.

The synchronising structure could provide a direct coupling between the rotatable element of the displacement pump and the rotatable element of the pressure recovery unit to make the two elements rotate with identical speeds, or the synchronising structure could provide a fixed ratio between the RPM of one of the rotatable elements and the RPM of the other rotatable element.

The displacement pump and the pressure recovery unit may e.g. be of the kind which are lubricated by the operating liquid, i.e. with the liquid which is displaced through the pump or unit. In such a pump or unit, the efficiency depends on the RPM, and typically, the efficiency decreases when the RPM increases. For a low number of RPM, the amount of liquid which passes through the pump or unit for each rotation is relatively large compared with the amount which passes through the pump or unit for each rotation at larger RPM.

This effect may be utilised in a particularly advanced way by using a displacement pump and a pressure recovery unit having a different change in efficiency for a change in the synchronised RPM. If, as an example, the efficiency of the pump unit decreases less than the efficiency of the pressure recovery unit for a specific increase in the synchronised RPM, then the amount of the supplied inlet liquid decreases less than the amount of drained first liquid per rotation, and as a result, the amount of liquid which is forced through the membrane, i.e. the amount of the second liquid increases. In other words, this selection of displacement pump and pressure recovery unit enables an increase in the ratio of the second fluid to the first fluid by increasing RPM, and the ratio between the first and second liquids may in general be controlled by varying the synchronous rotational speeds of the pump element and the recovery element.

In order to protect the membrane against overloading, the RPM could be adjusted based on a pressure which is measured in the separation structure. As an example, the RPM could be adjusted based on a pressure difference between pressure of the inlet liquid and pressure of the first liquid when it leaves the separation structure, or just on the pressure on the side of the membrane which faces the inlet and the outlet of the first fluid.

Starting and stopping of an apparatus, in particular a reverse osmosis structure may be undesirable since it typically reduces the lifetime of the membrane or at least reduces the time between necessary cleanings of the membrane. In order to reduce the number of starts and stops of the apparatus, the RPM could be adjusted based on consumption of one of the first and second liquids. In a desalination apparatus for providing freshwater from saltwater or contaminated water, the RPM may be adjusted based on the consumption of the freshwater, preferably to achieve a production of the freshwater which equals the consumption. Accordingly, the apparatus may comprise means for determining the consumption. This could comprise a flow measuring structure inserted in a pipeline which drains the first and/or the second liquid away from the separation structure, or it may comprise a level measuring structure in a buffer tank which receives one or both of the first and second liquids.

To further protect the membrane against overloading and thus to increase the lifetime of the apparatus or membrane or to increase the time between cleanings of the membrane, the apparatus may further comprise a start-up structure by which a maximum acceleration of the drive structure and thus of the pump element and of the recovery element can be specified. Accordingly, when the apparatus is switched on, it may be adjusted to start the rotation from zero RPM and to achieve its desired speed over a selectable interval, e.g. over 1 to 5 minutes, such as to achieve the desired speed after 3 minutes. This facilitates a controllable increase of pressure in the separation structure and thus protects the membrane against overloading.

In a second aspect, the invention provides a method of operating a liquid treatment apparatus comprising a separation structure with a membrane, an inlet for receiving an inlet liquid, a first outlet for delivering a first liquid which has not passed through the membrane, and a second outlet for delivering a second liquid which has passed through the membrane, the treatment apparatus further comprising a displacement pump adapted to supply an amount of inlet liquid to the separation structure proportional to the rotation of a pump element, and a pressure recovery unit adapted to drain an amount of first liquid from the separation structure proportional to rotation of a recovery element, the method comprising driving the pump element and the recovery element synchronously at different speeds depending on consumption of a liquid which is received from the separation structure.

In a third aspect, the invention provides a method of operating a liquid treatment apparatus comprising a separation structure with a membrane, an inlet for receiving an inlet liquid, a first outlet for delivering a first liquid which has not passed through the membrane, and a second outlet for delivering a second liquid which has passed through the membrane, the treatment apparatus further comprising a displacement pump adapted to supply an amount of inlet liquid to the separation structure proportional to rotation of a pump element, and a pressure recovery unit adapted to drain an amount of first liquid from the separation structure proportional to rotation of a recovery element, the method comprising driving the pump element and the recovery element synchronously at different speeds depending on a pressure measured in the separation structure.

In a fourth aspect, the invention provides a method of operating a liquid treatment apparatus comprising a separation structure with a membrane, an inlet for receiving an inlet liquid, a first outlet for delivering a first liquid which has not passed through the membrane, and a second outlet for delivering a second liquid which has passed through the membrane, the treatment apparatus further comprising a displacement pump adapted to supply an amount of inlet liquid to the separation structure proportional to rotation of a pump element, and a pressure recovery unit adapted to drain an amount of first liquid from the separation structure proportional to rotation of a recovery element, the method comprising adjusting a pressure gradient in the separation structure by adjusting an acceleration of a synchronous rotation of the pump element and the recovery element.

In a fifth aspect, the invention provides a method of operating an osmosis apparatus in an inverse mode comprising an osmosis structure with a reverse osmosis membrane, an inlet adapted during normal operation to receive saltwater, a first outlet for delivering a brine which has not passed through the membrane, and a second outlet for delivering freshwater which has passed through the membrane, the treatment apparatus further comprising a displacement pump adapted to supply an amount of the saltwater to the reverse osmosis structure proportional to the rotation of a pump element, and a pressure recovery unit adapted to drain an amount of the brine from the reverse osmosis structure proportional to the rotation of a recovery element, the method comprising applying freshwater to the inlet and driving the pump element and the recovery element synchronously at a speed which is lower than a speed which is necessary for activating permeation of saltwater through the membrane. As an example, the apparatus may normally be operated at a certain RPM to provide permeation of saltwater through the membrane, and when freshwater is flushed through the structure, the apparatus is operated at a speed in the range of 35-70 pct. of the speed during normal operation. Due to an osmotic pressure, the freshwater may destroy bacteria which are collected in the membrane.

DETAILED DESCRIPTION

In the following, a preferred embodiment of the invention will be described in further details with reference to the drawing in which.

Figure 1:
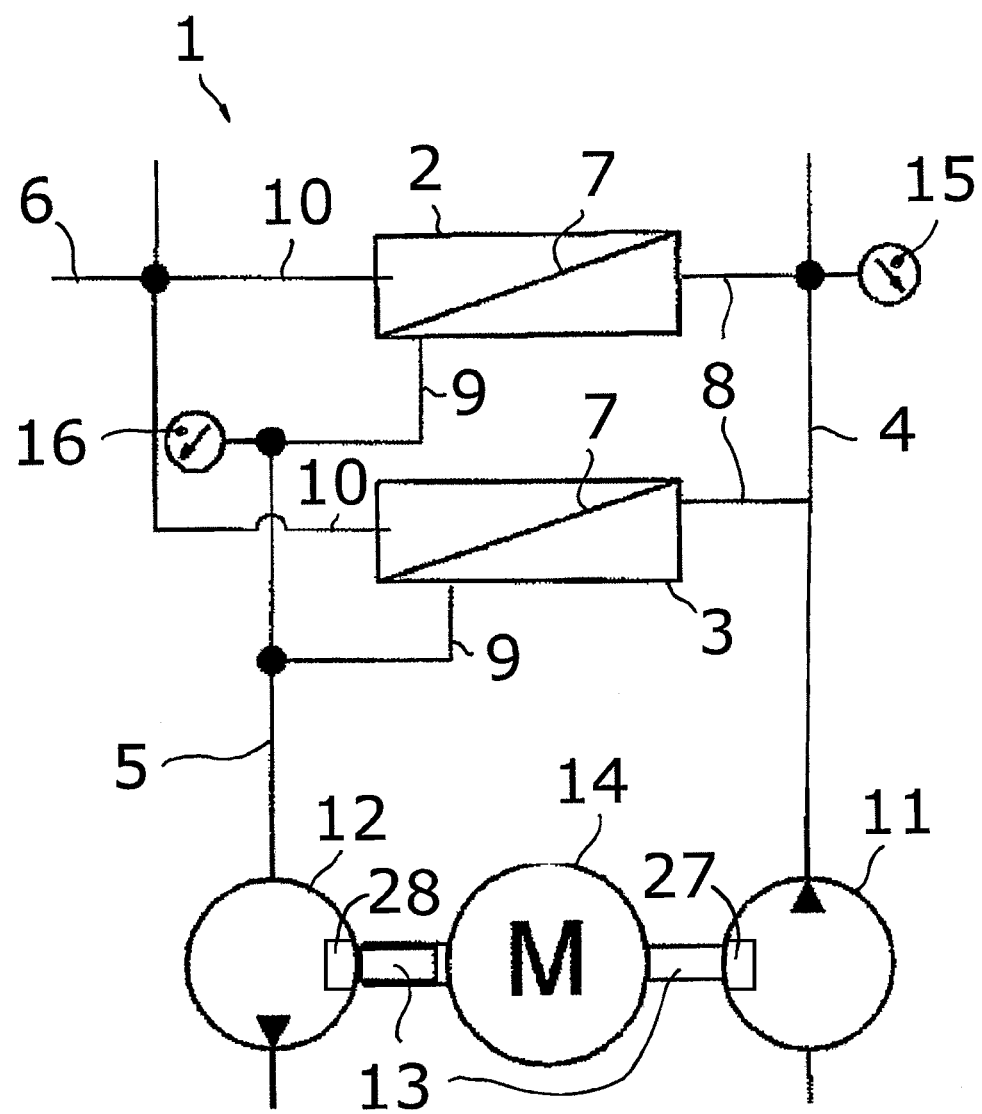
FIG. 1 illustrates a reverse osmosis apparatus according to the invention.

FIG. 1 illustrates schematically a reverse osmosis apparatus 1 for providing freshwater from saltwater. The apparatus comprises two separation structures 2, 3 connected in parallel between an inlet pipe 4, a first outlet pipe 5 for a first liquid, in this case brine, and a second outlet pipe 6 for a second liquid, in this case freshwater. Each separation structure comprises a membrane 7, an inlet 8 for receiving an inlet liquid (in this case saltwater), a first outlet 9 for delivering a first liquid (in this case brine with a relatively high salt concentration), and a second outlet 10 for delivering a second liquid which is freshwater, i.e. water which has passed through the reverse osmosis membranes 7. The apparatus further comprises an axial piston displacement pump 11 which supplies the saltwater at a pressure of 60-70 bar. A pressure recovery unit or pressure converter 12 located on the other side of the separation structures 2, 3 transfers the energy of the high pressure brine to the saltwater which enters the separation structure. The pressure converter 12 and the pump 11 are driven via one common shaft 13 by a frequency controlled motor 14. The pump 11 includes a rotational pump element 27 and the pressure converter 12 inches a rotational recovery element 28. The pump element 27 and recovery element 28 are connected with shaft 13.

A first pressure sensor 15 measures the pressure in the inlet, and a second pressure sensor 16 measures the pressure in the first outlet. In one mode of operation, the RPM of the motor 14 and thus of the pump 11 and the recovery unit 12 is controlled based on a pressure difference between the pressures measured by the first and second pressure sensors 15, 16.

Figure 2:
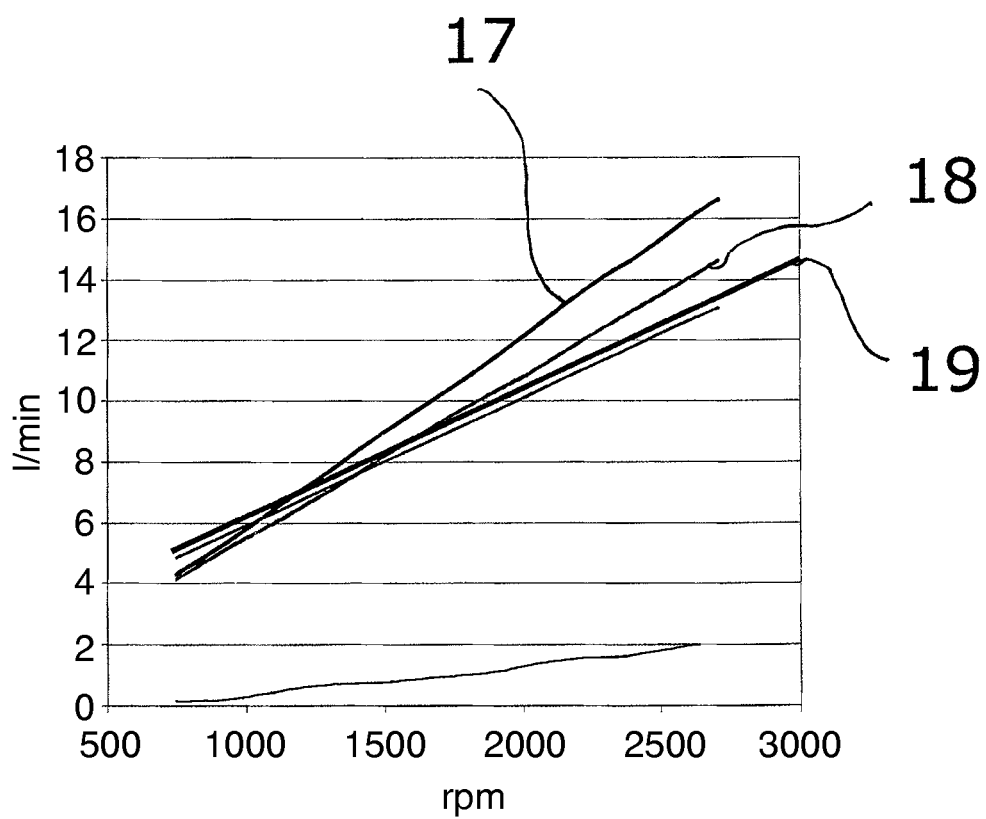
FIG. 2 illustrates a ratio between RPM and displaced amounts of fluid by the displacement pump and the pressure recovery unit.

The pump graph 17 in FIG. 2 illustrates the ratio between the RPM (along the abscissa) of the pump 11 and the amount of liquid in litres per minute (along the ordinate), which is displaced into the inlet 8 by the pump 11. The recovery graph 18 illustrates the ratio between the RPM (along the abscissa) of the pressure converter 12 and the amount of liquid in litres per minute (along the ordinate), which is displaced out of the first outlet 9 by the pressure converter 12. As indicated by the difference in the inclination of the two graphs 17, 18, the efficiency, i.e. the amount of displaced liquid per minute related to the RPM, of the pressure recovery unit 12 and the pump 11 change differently for a change in the RPM. Since the inclination of the pump graph 17 is steeper than the inclination of the recovery graph 18, an increase in RPM results in an increase in the difference between the amount of liquid which enters through inlet 8 and the amount of liquid which drains through the first outlet 9. Since the difference necessarily has to drain out of the separation structure through the second outlet 10, the increase in the difference causes an increase in the amount of liquid per minute which permeates through the membrane 7, and thus an increased production rate of freshwater. In FIG. 2, the recovery rate graph 19 indicates the difference in inclination, and thus the recovery rate of the apparatus.

The output of the liquid treatment apparatus 1 may thus be controlled by varying the RPM of the synchronised motion of the pump and of the recovery unit. The RPM can, as mentioned above be measured based on a pressure in the separation structure, e.g. by using the two pressure sensors 15, 16 disclosed in FIG. 1, or as will be discussed relative to FIG. 3, based on consumption of freshwater.

Figure 3:
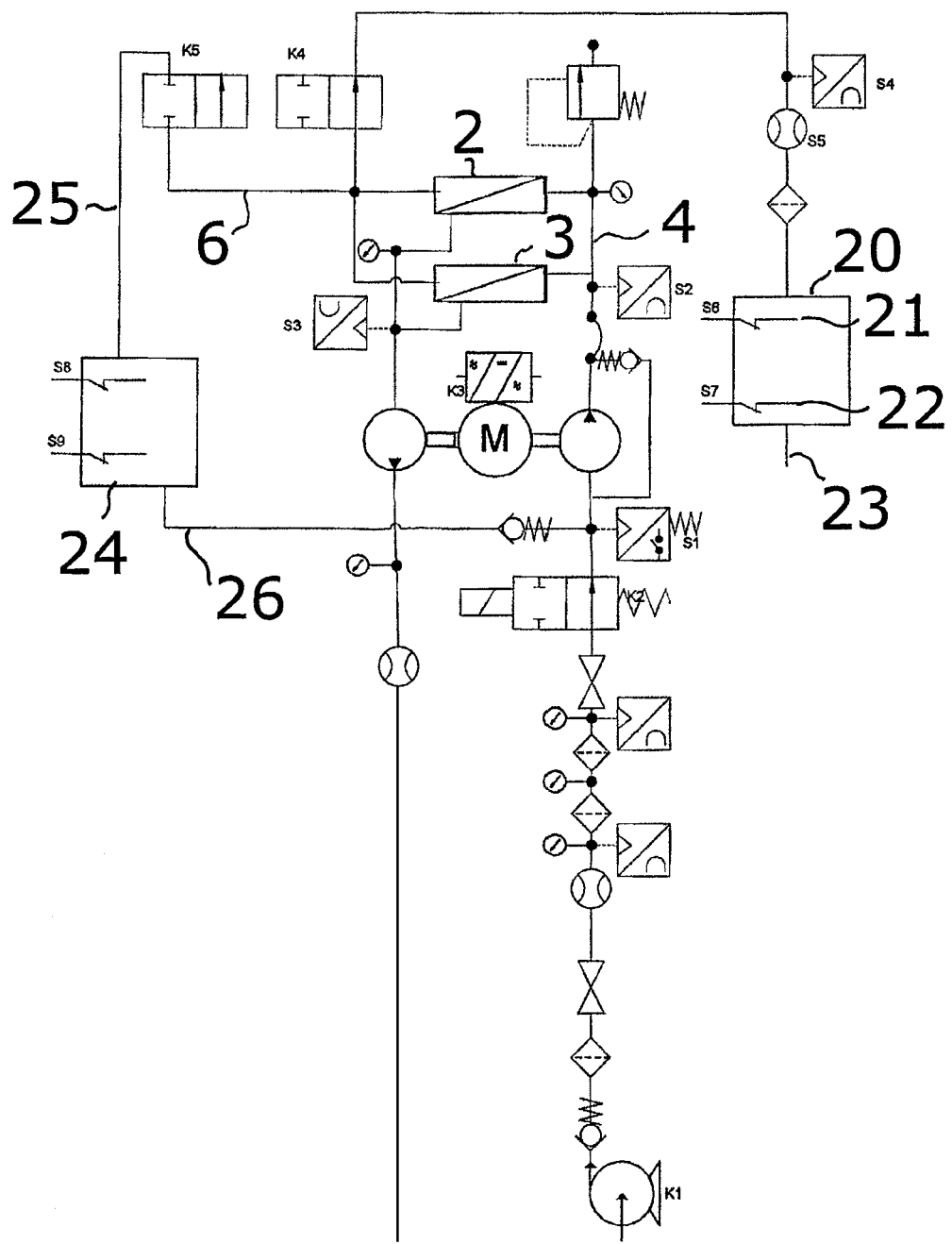
FIG. 3 illustrates the reverse osmosis apparatus in FIG. 1 including a tank for collection of produced freshwater.

FIG. 3 shows the apparatus of FIG. 1 in a more complete configuration including a tank 20 for collecting freshwater. The tank includes an upper level switch 21 and a lower level switch 22. In order to reduce the number of starts and stops of the apparatus, the level switches are located at a distance from the top and bottom, respectively. When the upper level switch is triggered, the tank therefore has additional space for freshwater. When the upper level switch is triggered, the RPM can be reduced until the freshwater level decreases to a lower level. In a corresponding manner, triggering of the lower level switch may cause an increased RPM until the freshwater level gets above the lower limit. In an alternative embodiment, a flow metre is inserted in the delivery pipe 23 to measure a consumption of the freshwater, and the RPM is controlled to compensate for the actual consumption.

FIG. 3 further shows a second tank 24 which receives freshwater from the separation structures 2, 3 when the valve k5 connects the conduit 25 to the outlet pipe 6. In a similar manner, the valve k4 may connect or disconnect the flow of freshwater to the tank 20. The outlet 26 of the tank 24 is connectable to the inlet pipe 4 via the switch s1. When freshwater from the tank 24 is guided to the inlet of the reverse osmosis structures, the membrane and the area between the inlet and the first outlet are cleaned by an osmotic pressure which destroys micro organisms which may exist in the salt environment. When freshwater is guided through the reverse osmosis structure, it is not necessary to create permeation of water through the membrane but merely to flush the membrane. Accordingly, the pressure in the reverse osmosis structure during this procedure may be lowered considerably relative to the pressure applied to activate the permeation of water through the membrane. In this respect, the variable and synchronous rotational speed of the pump element and recovery element is further advantageous since it facilitates an improved way of controlling the pressure in the reverse osmosis structure when changing from saltwater to freshwater. Typically, the RPM can be lowered to a range of 35-70 pct. of the RPM which is considered for activating the permeation of water through the membrane.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A liquid treatment apparatus comprising:
a separation structure comprising a membrane, an inlet for receiving an inlet liquid, a first outlet for delivering a first liquid which has not passed through the membrane, and a second outlet for delivering a second liquid which has passed through the membrane,
a displacement pump comprising a rotational pump element, the displacement pump being adapted to supply an amount of inlet liquid to the separation structure proportional to the rotation of the pump element, and
a pressure recovery unit comprising a rotational recovery element, the pressure recovery unit being adapted to drain an amount of first liquid from the separation structure proportional to the rotation of the recovery element,
a drive structure driving and rotating the rotational pump element of the displacement pump and the rotational recovery element of the pressure recovery unit;
wherein the drive structure is adapted to individually vary and synchronize a rotational speed (RPM) of the pump element and a rotational speed (RPM) of the recovery element based on a flow rate through the second outlet of the separation structure;
wherein the displacement pump and the pressure recovery unit have different changes in efficiency for a change in the synchronized RPM of the pump element and RPM of the recovery element to enable control of a ratio between the first and second liquids by varying the synchronized RPM of the pump element and RPM of the recovery element.

2. The apparatus according to claim 1, wherein the displacement pump provides an essentially fixed geometric displacement relative to the rotation of the pump element.

3. The apparatus according to claim 2, wherein the displacement pump is an axial piston displacement pump.

4. The apparatus according to claim 2, wherein the displacement pump and the pressure recovery unit have a similar structure.

5. The apparatus according to claim 1, wherein a recovery rate increases when the synchronized RPM of the pump element and RPM of the recovery element increase.

6. The apparatus according to claim 1, wherein the separation structure is a reverse osmosis structure.

7. The apparatus according to claim 1, wherein the displacement pump for a fixed RPM provides a fixed ratio between liquid displacement and RPM.

8. The apparatus according to claim 1, wherein the drive structure comprises an electrically driven motor with variable RPM.

* * * * *